3,272,600
METHOD OF PRODUCING NUCLEAR FUEL
MONOCARBIDES FROM HIGHER CARBIDES
Ronald George Sowden, Wallingford, and Neville Hodge, Oulton, Stone, England, assignors to United Kingdom Atomic Energy Authority, London, England
Filed Dec. 18, 1963, Ser. No. 331,415
Claims priority, application Great Britain, Dec. 21, 1962, 48,448/62
10 Claims. (Cl. 23—344)

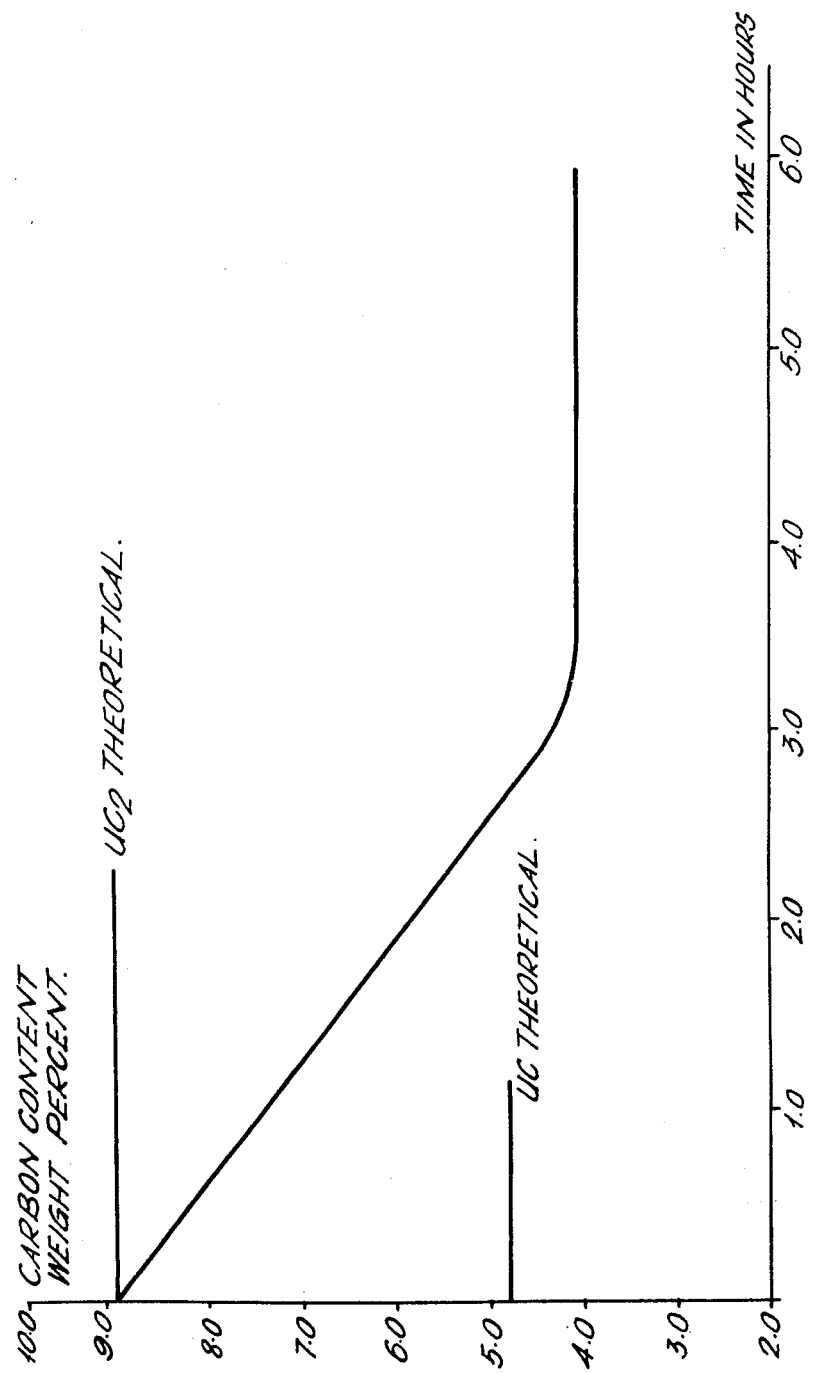

The present invention relates to nuclear fuel materials and in particular to the carbides of uranium and/or plutonium.

For nuclear fuel applications, the material generally required is the monocarbide, UC or (U, Pu) C. If a stoichiometric excess of carbon is present, however, higher carbides may be present, i.e. $UC_2$ and $U_2C_3$ in the uranium case and $(U, Pu)_2C_3$ in the case of the mixed carbide. There is evidence that, at high temperatures, carbon in higher carbides may react with cladding material and, for example, carbon in $UC_2$ can bring about embrittlement of stainless steel cladding.

Carbide fuel material can be made by reacting uranium dioxide or uranium metal with carbon at elevated temperatures in excess of 1000° C. but even if the stoichiometric amount of carbon is provided so as to give the monocarbide, it has been found that a proportion of this carbon will be present as free carbon or as the dicarbide and that the fuel material will contain oxygen (as uranium dioxide or uranium oxycarbide U(O, C)) as an impurity. The presence of oxygen can be tolerated, although at present it seems preferable to reduce its content to the minimum, but substantially no free carbon or dicarbide ought to be present in a satisfactory fuel material.

It is therefore an object of the present invention to provide a process for the reduction of fuel material dicarbides and sesquicarbides to the monocarbides, it being understood that these carbides are of uranium, plutonium or a mixture thereof.

According to the present invention there is provided a method for the production of fuel material monocarbides comprising, reacting a fuel material higher carbide with hydrogen at a temperature of not less than 1000° C. and in the substantial absence of oxygen and water vapour.

The monocarbide thus obtained, may be subsequently sintered or alternatively the sintering and reduction may be performed simultaneously by heating a compacted higher carbide powder at a temperature of about 1500° C. in flowing hydrogen.

The amount of oxygen and water vapour present in the hydrogen must be reduced to the practical minimum and we prefer that the hydrogen should contain less than 25 parts per million by volume of water vapour and less than 1 part per million by volume of oxygen.

In order that the present invention may more readily be understood, embodiments of the same will now be described with reference to the accompanying drawing of which the single figure is a graph showing the carbon content of a uranium carbide plotted against time.

*Example I*

In a typical example in accordance with the present invention, uranium dicarbide was prepared by reacting uranium dioxide with carbon at 1450° C. and on analysis was shown to contain 0.9% by weight uncombined carbon and 0.7% by weight of combined oxygen. A sample of this uranium dicarbide weighing 250 milligrams was ground by hand to powder in an argon box.

The ground material was loaded into an alumina boat and inserted in a silica tube located inside a mullite tube electric furnace capable of operation at temperatures up to 1500° C. Argon of purity better than 8 parts per million by volume water vapour and 1 part per million by volume of oxygen was then flowed through the furnace to flush it, whilst the temperature of the furnace was raised to 1000° C. The flow of argon was then cut off and hydrogen passed through at the rate of approximately 1 litre per minute for a period of some 3 to 4 hours. Thereafter the power to the furnace was cut off and the argon flow to the furnace reconnected whilst the furnace was allowed to cool to 500° C. Thereafter the argon flow was cut off and the furnace allowed to cool to room temperature in a static argon atmosphere. It should be realised that the use of argon is not considered to be essential since a hydrogen atmosphere could be used throughout the process.

Samples were removed from time to time during the course of the experiment and were subjected to X-ray, total carbon and oxygen analysis with the result shown in the drawing which represents the carbon content of the sample plotted against time of reaction. It will be seen that the carbon content falls regularly from the original 9% by weight down to approximately 4.1% by weight, the 0.7% by weight of oxygen being unaffected. X-ray analysis confirmed that the only substances present were uranium monocarbide and uranium dioxide with possibly U(O, C) and that free carbon and uranium dicarbide were absent. It should be noted that the ultimate level of carbon (4.1% by weight) is considerably lower than that in stoichiometric uranium monocarbide (4.8% by weight), but that the mole ration metal/(carbon and oxygen) is, within experimental error, unity.

*Examples II–V*

Further samples of uranium dicarbide containing varying levels of oxygen, were reduced with hydrogen as in Example I. The results obtained are summarised in Table I, a blank space indicating that no determination of a particular quantity was performed.

TABLE I

| Example | Starting Material ($UC_2$) | | | Product (UC) | | | Mole Ratio (U=1.00) | |
|---|---|---|---|---|---|---|---|---|
| | Total carbon (w/o) | Oxygen (w/o) | Free Carbon (w/o) | Total Carbon (w/o) | Oxygen (w/o) | Free Carbon (w/o) | C | O |
| II | 9.03 | 0.69 | 0.79 | 4.15 | 0.73 | <0.01 | 0.87 | 0.11 |
| III | 9.14 | 0.23 | | 4.49 | 0.28 | | 0.94 | 0.044 |
| IV | 9.40 | 0.13 | | 4.65 | 0.21 | | 0.97 | 0.032 |
| V | 9.07 | 1.13 | 0.53 | 4.18 | 1.18 | <0.01 | | |

X-ray analysis of the product of Examples II–IV confirmed that the only substance present was uranium monocarbide whilst, in the case of Example V, some uranium dioxide was also found to be present. It is considered that the limit of oxygen solubility in the monocarbide lattice is about 0.8 w/o and that oxygen in excess of this is present as uranium dioxide, as is the case in Example V. The surface area of the starting materials in all these examples was 0.40 sq.m./gm.

Examples VI–IX

Similar experiments to those described for uranium carbide were performed using plutonium sesquicarbide as the starting material. The results obtained are summarised in Table II.

TABLE II

| Example | Starting material ($Pu_2C_3$) | | | Reduction time (hours) | Product (PuC) | |
|---|---|---|---|---|---|---|
| | Total Carbon (w/o) | Oxygen (w/o) | Surface area (sq. m./g.) | | Total Carbon (w/o) | Oxygen (w/o) |
| VI | 6.93 | 0.44 | 0.35 | 6 | 5.44 | 0.51 |
| VII | 6.93 | 0.44 | 0.35 | 10 | 4.75 | 0.52 |
| VIII | 7.12 | 0.16 | 1.8 | 3.2 | 5.14 | 0.22 |
| IX | 7.12 | 0.16 | 1.8 | 6 | 4.47 | 0.20 |

The reduction took place more slowly than with uranium dicarbide and was, to some extent, dependent on the surface area of the starting material. X-ray analysis of the product showed, in the case of Examples VII and IX, that reduction was complete, plutonium carbide being the only substance present, whilst in the case of Examples VI and VIII, reduction was incomplete, a small amount of plutonium sesquicarbide remaining in the monocarbide.

Examples X–XV

Further experiments using the co-carbides of plutonium and uranium again showed that free carbon was removed and the material reduced to the monocarbide. The U/Pu ratio in the co-carbide was 85:15 and the surface area of the starting material in each case was 2.0 sq. m./gm. The results obtained are summarized in Table III.

TABLE III

| Example | Starting Material (U, Pu)C+ (U, Pu)$_2$C$_3$ | | Reduction time (hours) | Product (U, Pu)C | | Mole Ratios (U+Pu=1.00) | |
|---|---|---|---|---|---|---|---|
| | Total Carbon (w/o) | Oxygen (w/o) | | Total Carbon (w/o) | Oxygen (w/o) | C | O |
| X | 5.59 | 0.15 | 10 | 4.43 | 0.57 | 0.92 | 0.09 |
| XI | 6.04 | 0.25 | 6 | 4.29 | 0.59 | 0.90 | 0.09 |
| XII | 6.04 | 0.25 | 3.5 | 4.45 | 0.52 | 0.92 | 0.08 |
| XIII | 6.73 | 0.27 | 3 | 4.49 | 0.41 | 0.93 | 0.065 |
| XIV | 5.24 | 0.51 | 3 | 4.16 | 0.63 | 0.87 | 0.10 |
| XV | 6.73 | 0.27 | 3 | 4.58 | 0.48 | 0.95 | 0.07 |

It will be noted that the reaction is complete with a reduction time of as little as three hours, the product in each case when subjected to X-ray analysis proving to be the mixed monocarbide (U, Pu)C.

The argon used in all the preceding experiments was purified by being passed over heated copper oxide, manganese oxide and uranium and by being passed through adsorbents for carbon dioxide and water. The hydrogen was purified by being passed through a catalytic recombination unit to convert the oxygen content to water and through a charcoal trap, molecular sieve and phosphorus pentoxide to remove the water content, the final purity being better than 25 parts per million by volume water vapour and 1 part per million by volume oxygen.

Examples XVI–XXIV

Further experiments were carried out in which powders containing (U, Pu)C and (U, Pu)$_2$C$_3$ were reduced to (U, Pu)C and sintered to a high density simultaneously. Powders of the hyperstoichiometric carbides were compacted at 20 tons per square inch and sintered for one hour in flowing hydrogen. The experiments are summerised in Table IV.

TABLE IV

| Example | Pu content percent of (Pu+U) | Powder analysis | | | Sintering Conditions | | Pellet analysis | | | |
|---|---|---|---|---|---|---|---|---|---|---|
| | | Carbon (w/o) | Oxygen (w/o) | Added Nickel (w/o) | Time to attain temp. (hrs.) | Sintering temp., (° C.) | Carbon (w/o) | Oxygen (w/o) | Nickel (w/o) | Density (g./cc.) |
| XVI | 26 | 4.90 | 0.14 | Nil | 7.5 | 1,495 | 4.43 | 0.21 | | 12.6 |
| XVII | 26 | 4.90 | 0.14 | Nil | 6 | 1,520 | 4.58 | 0.20 | | 13.2 |
| XVIII | 26 | 5.50 | 0.60 | Nil | 6.5 | 1,520 | 4.18 | 0.62 | | 12.6 |
| XIX | 15 | 6.73 | 0.27 | Nil | 4.5 | 1,500 | 4.82 | 0.23 | | 11.3 |
| XX | 15 | 5.77 | 0.16 | Nil | 4.5 | 1,500 | 4.21 | 0.72 | | 10.6 |
| XXI | 15 | 6.73 | 0.27 | 0.2 | 4.5 | 1,500 | 4.50 | 0.43 | 0.17 | 13.3 |
| XXII | 15 | 5.77 | 0.16 | 0.2 | 4 | 1,500 | 4.00 | 0.62 | 0.20 | 13.0 |
| XXIII | 15 | 4.97 | 0.42 | Nil | 4.5 | 1,500 | 4.51 | 0.49 | | 10.0 |
| XXIV | 15 | 4.97 | 0.42 | 0.2 | 4 | 1,500 | 4.29 | 0.50 | 0.18 | 13.2 |

The mixed carbides of Examples XVI–XXII were obtained from the co-precipitated oxide, whilst those of Examples XXIII and XXIV were obtained by mixing, in a ball mill, separately prepared uranium carbide and plutonium sesquicarbide. It will be noted that the carbides of high plutonium content (26% Pu) sintered to a high density without the use of a sintering aid whilst with the carbides with a lower plutonium content (15% Pu), high densities were only attained by the use of nickel as a sintering aid. The addition of small quantities of nickel increased the bulk density to better than 95% of theoretical.

Thus, conversion to a single phase and densification can be carried out simultaneously by this technique. It will be appreciated that the use of this technique, either as sequential steps or a simultaneous process may eliminate the need for close control of carbon in the early stages of carbide manufacture.

We claim:

1. A method for the production of fuel material monocarbides selected from the group consisting of uranium monocarbide, plutonium monocarbide and mixtures thereof, such method comprising the step of reacting a fuel material higher carbide selected from the group consisting of uranium sesquicarbide, uranium dicarbide, plutonium sesquicarbide and mixtures thereof with hydrogen at a temperature of not less than 1000° C. in the substantial absence of oxygen and water vapour.

2. A method according to claim 1 wherein when the fuel material higher carbide is uranium dicarbide or mixture of uranium and plutonium higher carbides, the reaction is effected at 1000° C. for at least 3 hours.

3. A method according to claim 1 wherein when the fuel material higher carbide is plutonium sesquicarbide, the reaction is effected at 1000° C. for not less than 6 hours.

4. A method acording to claim 1 wherein the hydrogen contains less than 25 parts per million by volume of water vapour and less than 1 part per million by volume of oxygen.

5. A method according to claim 1 wherein the hydrogen is caused to flow over the higher carbide at a rate of approximately 1 litre per minute.

6. A method according to claim 1 including the preliminary step of raising the fuel material higher carbide to the reaction temperature in an atmosphere of argon prior to effecting the reaction with hydrogen.

7. A method according to claim 6 including the final step of cooling the fuel material carbide, after reaction with hydrogen, in an atmosphere of argon.

8. A method according to claim 6 wherein the argon contains not more than 8 parts per million by volume of water vapour and 1 part per million by volume of oxygen as impurities.

9. A method for the production of sintered fuel material monocarbides selected from the group consisting of sintered uranium monocarbide, sintered plutonium monocarbide, and mixtures thereof, such method comprising the step of heating a fuel material higher carbide selected from the group consisting of uranium sesquicarbide, uranium dicarbide, plutonium sesquicarbide and mixtures thereof in the presence of gaseous hydrogen to a temperature of approximately 1500° C. in the substantial absence of oxygen and water vapour.

10. A method according to claim 9 wherein when the fuel material higher carbides is a mixture of uranium and plutonium monocarbides and sesquicarbides, the time of sintering at 1500° C. is at least 1 hour.

No references cited.

BENJAMIN R. PADGETT, *Acting Primary Examiner.*

S. TRAUB, *Assistant Examiner.*